(12) United States Patent
Silva et al.

(10) Patent No.: US 8,641,521 B2
(45) Date of Patent: Feb. 4, 2014

(54) EMULATION IN A SECURE REGULATED ENVIRONMENT

(75) Inventors: Robert Silva, Reno, NV (US); Edward Hennessy, Reno, NV (US); Stephen Shaffer, Reno, NV (US); Wai Chan, Pittsburgh, PA (US)

(73) Assignee: IGT, Reno, NV (US)

( * ) Notice: Subject to any disclaimer, the term of this patent is extended or adjusted under 35 U.S.C. 154(b) by 2141 days.

(21) Appl. No.: 11/225,406

(22) Filed: Sep. 12, 2005

(65) Prior Publication Data

US 2006/0046824 A1 Mar. 2, 2006

(51) Int. Cl.
*A63F 9/24* (2006.01)
(52) U.S. Cl.
USPC .................. 463/29; 463/16; 463/20; 463/25; 463/40; 463/42; 463/43
(58) Field of Classification Search
USPC ............ 463/16–20, 24, 25, 29, 40–43, 45, 47
See application file for complete search history.

(56) References Cited

U.S. PATENT DOCUMENTS

| | | | |
|---|---|---|---|
| 5,523,948 A | 6/1996 | Adrain | |
| 5,697,482 A | 12/1997 | Orus et al. | |
| 5,960,190 A | 9/1999 | MacKenna | |
| 6,379,246 B1 | 4/2002 | Dabrowski | |
| 6,439,996 B2 | 8/2002 | LeMay et al. | |
| 6,622,185 B1 | 9/2003 | Johnson et al. | |
| 6,672,963 B1 | 1/2004 | Link | |
| 6,716,103 B1 | 4/2004 | Eck et al. | |
| 6,852,031 B1 | 2/2005 | Rowe | |
| 6,979,266 B2 | 12/2005 | Lemay et al. | |
| 2002/0025850 A1 | 2/2002 | Hafezi | |
| 2002/0045484 A1* | 4/2002 | Eck et al. | 463/42 |
| 2002/0138594 A1 | 9/2002 | Rowe | |
| 2002/0144115 A1 | 10/2002 | LeMay et al. | |
| 2003/0037030 A1 | 2/2003 | Dutta et al. | |
| 2003/0188306 A1* | 10/2003 | Harris et al. | 717/174 |

(Continued)

FOREIGN PATENT DOCUMENTS

| | | |
|---|---|---|
| AU | 2005204245 | 1/2011 |
| CN | 101238494 | 8/2008 |

(Continued)

OTHER PUBLICATIONS

U.S. Office Action mailed Oct. 4, 2007, from U.S. Appl. No. 10/927,581.

(Continued)

*Primary Examiner* — Dmitry Suhol
*Assistant Examiner* — Andrew Kim
(74) *Attorney, Agent, or Firm* — Foley & Lardner LLP

(57) ABSTRACT

Some implementations of the invention are directed to the use of legacy gaming software (or other non-native gaming software) in gaming machines that have a different architecture from that of the gaming machine for which the gaming software was written. Other implementations of the invention allow games of chance to be emulated, at least in part, on a device other than a gaming machine. The device may be, for example, a host device such as a workstation, a personal computer, a personal digital assistant, etc. The device may be a wired or a wireless device and may be used in a gaming establishment or at a remote location. Some aspects of the invention provide novel methods for dispute resolution and troubleshooting via such devices.

13 Claims, 15 Drawing Sheets

(56) References Cited

U.S. PATENT DOCUMENTS

| | | | |
|---|---|---|---|
| 2003/0200290 | A1 | 10/2003 | Zimmerman et al. |
| 2003/0212859 | A1 | 11/2003 | Ellis et al. |
| 2004/0043814 | A1* | 3/2004 | Angell et al. .................. 463/25 |
| 2004/0147314 | A1 | 7/2004 | LeMay et al. |
| 2004/0214628 | A1 | 10/2004 | Boyd et al. |
| 2005/0223219 | A1* | 10/2005 | Gatto et al. .................. 713/156 |
| 2005/0235117 | A1 | 10/2005 | Floman et al. |
| 2005/0239538 | A1* | 10/2005 | Dixon ............................ 463/20 |
| 2005/0261062 | A1* | 11/2005 | Lewin et al. ..................... 463/42 |
| 2006/0046819 | A1 | 3/2006 | Nguyen et al. |
| 2006/0046824 | A1 | 3/2006 | Silva et al. |
| 2006/0046855 | A1 | 3/2006 | Nguyen et al. |

FOREIGN PATENT DOCUMENTS

| | | |
|---|---|---|
| EP | 1934959 | 6/2008 |
| WO | 99/60498 | 11/1999 |
| WO | 2007/021506 | 2/2007 |

OTHER PUBLICATIONS

International Search Report, mailed Nov. 24, 2006 from related International Application No. PCT/US2006/029549, 6 pp. including Notification of Transmittal.

Written Opinion of the International Searching Authority, mailed Nov. 24, 2006 from related International Application No. PCT/US2006/029549, 5 pp.

US Final Office Action dated Mar. 31, 2008 issued in U.S. Appl. No. 10/927,581.

US Office Action dated Oct. 3, 2008 issued in U.S. Appl. No. 10/927,581.

US Final Office Action dated Apr. 6, 2009 issued in U.S. Appl. No. 10/927,581.

US Office Action dated Oct. 6, 2009 issued in U.S. Appl. No. 10/927,581.

US Interview Summary dated Jan. 13, 2010 issued in U.S. Appl. No. 10/927,581.

US Office Action dated Apr. 8, 2010 issued in U.S. Appl. No. 10/927,581.

US Office Action dated Sep. 21, 2009 issued in U.S. Appl. No. 11/205,619.

US Interview Summary dated Jan. 25, 2010 issued in U.S. Appl. No. 11/205,619.

US Office Action dated Mar. 26, 2010 issued in U.S. Appl. No. 11/205,619.

Chinese Office Action dated Aug. 21, 2009 issued in 200680028848.9.

Chinese Office Action dated May 17, 2010 issued in 200680028848.9.

Australian Office Action dated Apr. 1, 2010 issued in 2005204245.

Australian First Examination Report dated Nov. 17, 2010, from Application No. 2006280249, 4 pps.

Australian Second Examination Report dated Nov. 9, 2011, from Application No. 2006280249, 2 pps.

Australian Third Examination Report dated Dec. 14, 2011 issued in AU2006280249, 1 pg.

Chinese Office Action dated Apr. 6, 2011, from Application No. 200680028848.9, 19 pps.

Chinese Office Action dated Jun. 23, 2011, from Application No. 200680028848.9, 19 pps.

Harris, Craig. Hoyle Casino—Game Boy Color Review at IGN, Oct. 25, 2000, IGN. p. 1-3., http://gameboy.ign.com/articles/164/164559p1.html.

International Preliminary Report on Patentability dated Feb. 20, 2008, from Application No. PCT/US2006/029549, 6 pps.

U.S. Final Office Action dated Dec. 10, 2010, from U.S. Appl. No. 10/927,581, 12 pps.

U.S. Final Office Action dated Dec. 9, 2010, from U.S. Appl. No. 11/205,619, 19 pps.

U.S. Interview Summary dated Jun. 30, 2010, from U.S. Appl. No. 10/927,581, 3pps.

U.S. Notice of Allowance dated Jan. 15, 2013, from U.S. Appl. No. 10/927,581, 8 pps.

U.S. Notice of Panel Decision from Pre-Appeal Brief Review dated Apr. 27, 2011, from U.S. Appl. No. 10/927,581, 2 pps.

U.S. Notice of Panel Decision from Pre-Appeal Brief Review dated May 9, 2011, from U.S. Appl. No. 11/205,619, 2 pps.

U.S. Office Action dated Mar. 16, 2012 issued in U.S. Appl. No. 10/927,581, 13 pps.

US Interview Summary dated Jun. 30, 2010 issued in U.S. Appl. No. 11/205,619, 3 pps.

US Office Action dated Oct. 6, 2009 issued in U.S. Appl. No. 10/927,581, 13 pps.

* cited by examiner

EMULATION IN A SECURE REGULATED ENVIRONMENT

CROSS-REFERENCE TO RELATED APPLICATIONS

This application is related to U.S. patent application Ser. No. 11/205,619, entitled "EMULATION METHODS AND DEVICES FOR A GAMING MACHINE" and filed Aug. 15, 2005, and to U.S. patent application Ser. No. 10/927,581, entitled "MODULE FOR A GAMING MACHINE" and filed Aug. 25, 2004, both of which are hereby incorporated by reference for all purposes.

BACKGROUND OF THE INVENTION

This invention relates to game playing methods for gaming machines such as video slot machines, video poker machines, bingo machines, etc. More particularly, the present invention relates to methods and apparatus for providing emulation capabilities relating to games of chance.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine, such as a top box that usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

Players' interest may also be enhanced by enhanced audio and/or visual displays that are possible with new peripheral devices. For example, players will generally prefer a liquid crystal ("LCD") display over the prior art cathode ray tube ("CRT") displays of many legacy gaming machines. In addition, players may appreciate the audio and visual effects made possible by the faster processing speeds of modern processors.

Although players will generally enjoy the benefits of gaming machine upgrades, players still may wish to play at least some familiar, existing games of chance on newer gaming machines. For example, a player may have one or more favorite games, perhaps associated with an enjoyable gaming experience of the past.

However, gaming software is quite platform-specific. A considerable amount of effort is required to re-write legacy gaming software so that such existing games can be provided on gaming machines having an upgraded CPU and/or different peripheral devices. One option is to take the old source code and re-compile it for native software on the new gaming machine platform. Alternatively, the source code may be re-written from scratch. In either case, the modified gaming software would need to be approved by the relevant gaming regulatory body. Obtaining such approval is time-consuming and costly. It would be desirable to provide devices and methods for overcoming at least some of the foregoing drawbacks.

SUMMARY OF THE INVENTION

Some implementations of the invention are directed to the use of legacy gaming software (or other non-native gaming software) in gaming machines that have a different architecture from that of the gaming machine for which the gaming software was written. Other implementations of the invention allow games of chance to be emulated, at least in part, on a device other than a gaming machine. The device may be, for example, a host device such as a workstation, a personal computer, a personal digital assistant, etc. The device may be a wired or a wireless device and may be used in a gaming establishment or at a remote location. Some aspects of the invention provide novel methods for dispute resolution and troubleshooting via such devices.

Some implementations of the invention provide for at least some of the contents of gaming machine's non-volatile memory to be transmitted over a network and stored in a device other than the gaming machine, such as a server, a disk array such as a redundant array of inexpensive disks ("RAID"), etc. These implementations are particularly advantageous when used in combination with a server-based gaming system in which gaming machines may change game themes much more frequently than in the past.

Some implementations of the invention provide a method of managing a gaming network. The method includes these steps: providing a first game of chance on a gaming machine, the gaming machine having a first gaming machine architecture; storing game information, including but not limited to game states for the gaming machine while the first game of chance is being provided, on a non-volatile memory; receiving an indication that a second game of chance will be provided on the gaming machine; uploading the game information to a memory of a first networked device via the gaming network; determining whether the second game of chance was written for the first gaming machine architecture; and providing the second game of chance according to whether the second game of chance was written for the first gaming machine architecture.

The indication may be received from a gaming management server and/or from an input device of the gaming machine. The method may also include the step of downloading the second game of chance from the gaming management server.

If it is determined that the second game of chance was written for a second gaming machine architecture, the method can include the step of emulating the second gaming machine architecture on the gaming machine. Accordingly, the method may also include the step of enabling or disabling emulation software according to the determination of the determining step.

The method may also include the steps of retrieving the game information from the memory of the first networked device and reproducing at least one game display of the first game of chance on a second networked device. The second networked device may be, for example, a wired or wireless host device such as a personal computer, a personal digital assistant, etc. The second networked device need not be in communication with a network at the time the emulation is being performed.

The gaming machine includes a first processor having a first set of machine code instructions. The step of emulating the second gaming machine architecture may involve emulating a second processor having a second set of machine code instructions. The gaming machine comprises a first set of peripheral devices and the step of emulating the second gaming machine architecture may involve emulating a second gaming machine having a second set of peripheral devices.

Some implementations of the invention provide software embodied in a machine-readable medium. In some such implementations, the software includes instructions for controlling a gaming machine to perform the following steps: provide a first game of chance on a gaming machine, the gaming machine having a first gaming machine architecture, wherein the first game of chance was written for the first gaming machine architecture; receive an indication that a second game of chance will be provided on the gaming machine; determine that the second game of chance was written for a second gaming machine architecture; and provide the second game of chance on the first gaming machine. The providing step involves emulating the second gaming machine architecture.

The first gaming machine architecture includes a first processor having a first set of machine code instructions. The step of emulating the second gaming machine architecture involves emulating a second processor having a second set of machine code instructions. The first gaming machine architecture includes a first set of peripheral devices. The step of emulating the second gaming machine architecture involves emulating a second gaming machine having a second set of peripheral devices. The providing step may involve mapping second memory addresses corresponding to the second gaming machine architecture to first memory addresses corresponding to the first gaming machine architecture. The providing step may involve adding functionality that is not provided by the second game of chance.

The software may also include instructions for controlling the gaming machine to authenticate machine code for providing the second game of chance, wherein the authenticating step takes place during the providing step. If machine code for providing the second game of chance includes commands for invoking a first authentication technique, the method may further include instructions for controlling the gaming machine to perform the following steps: receive an instruction to authenticate the machine code according to the first authentication technique; authenticate the machine code using a second authentication technique; and return an indication that the machine code has been authenticated according to the first authentication technique.

The indication may be received from an input device of the gaming machine, from a gaming management server, etc. The software may also include instructions for controlling the gaming machine to download the second game of chance from the gaming management server.

Alternative aspects of the invention include methods of providing games of chance. One such method includes these steps: configuring a first device to provide a game of chance; testing the first device to determine that the game of chance has been provided with proper configuration information; and downloading the configuration information to a plurality of gaming machines, thereby allowing the plurality of gaming machines to be configured to provide the game of chance.

The testing step may involve running emulation software on the first device. The emulation software provides instructions for emulating a gaming machine architecture for which the game of chance was written. The first device may be, for example, a workstation, a personal computer, a gaming machine or a personal digital assistant.

The methods of the present invention may be implemented in software, hardware or firmware. Some such methods may be implemented in gaming machines or portions thereof, such as CPU boards of gaming machines, logic devices (including but not limited to programmable logic devices such as field programmable gate arrays ["FPGAs"]), etc. Other methods may be implemented by associated network devices or portions thereof, such as game servers and other servers that provide information or functionality regarding game software downloads. Still other methods of the invention may be performed by host devices such as personal computers, PDAs and other devices that are configured with emulation software.

These and other features and advantages of the invention will be described in more detail below with reference to the associated drawings.

DESCRIPTION OF THE PREFERRED EMBODIMENTS

Figure 1:
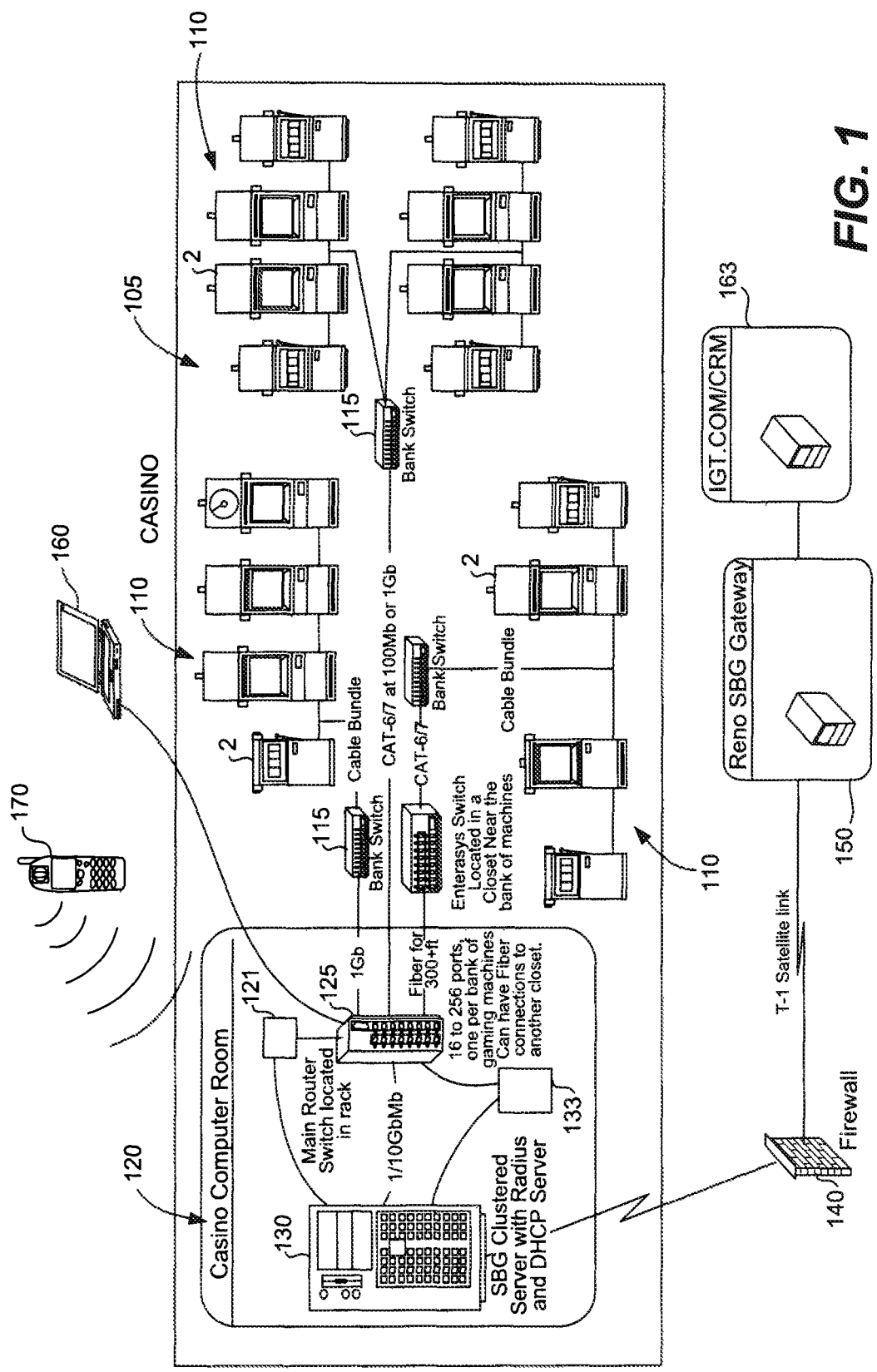
FIG. 1 illustrates one example of a network topology for implementing some aspects of the present invention.

Some implementations of the invention are directed to the use of legacy gaming software (or other non-native gaming software) in gaming machines that have a different architecture from that of the gaming machine for which the gaming software was written. As used herein, the terms "legacy gaming software," "old gaming software" or the like will mean software that was written for a legacy gaming machine that had an older CPU. The "architecture" of a gaming machine, as used herein, will mean the type of CPU, the I/O systems, peripheral devices, etc.

For example, IGT has a large library of legacy gaming software that was written for legacy gaming machines that use an Intel i960 (80960) processor as the CPU. As discussed in greater detail below, some implementations of the invention provide emulation software that allows such legacy gaming software to be executed on a gaming machine that has a different CPU and/or has different peripheral devices than the gaming machines for which the legacy gaming software was written. By providing such emulation software, there is no need to re-compile each legacy game in the library and re-submit each game for regulatory approval. Accordingly, huge savings in time and money can be realized.

Some embodiments of the invention can run both legacy software and software that was written for a gaming machine having a more advanced processor and/or peripheral devices. Such software will sometimes be referenced herein as "native games," "native gaming software," or the like. Such embodiments may be run in "emulation mode" for running non-native software and in "native mode" for running native software.

Other implementations of the invention allow games of chance to be emulated, at least in part, on a device other than a gaming machine. The device may be, for example, a host device such as a workstation, a personal computer, a personal digital assistant, etc. The device may be a wired or a wireless device and may be used in a gaming establishment or at a remote location. Some aspects of the invention provide novel methods for dispute resolution and troubleshooting via such devices.

Some aspects of the present invention are implemented, at least in part, in the context of a server-based gaming system, which will be referenced herein as an "SBG" system or the like. Accordingly, the present invention may be implemented in accordance with some methods and devices described in U.S. patent application Ser. No. 11/225,407, by Wolf et al., entitled "METHODS AND DEVICES FOR MANAGING GAMING NETWORKS" (the "SBG Application") and filed on Sep. 12, 2005, and in U.S. patent application Ser. No. 11/225,408, by Kinsley et al., entitled "METHODS AND DEVICES FOR AUTHENTICATION AND LICENSING IN A GAMING NETWORK" (the "License Manager Application") and filed on Sep. 12, 2005, which has granted as U.S. Pat. No. 8,152,628, both of which are incorporated herein by reference in their entirety and for all purposes.

Some implementations of the invention provide for at least some of the contents of gaming machine's non-volatile memory to be transmitted over a network and stored in a device other than the gaming machine, such as a server, a disk array such as a such as a redundant array of inexpensive disks ("RAID"), etc. In some embodiments, the target device is within a network attached storage ("NAS") system, a storage area network ("SAN") or another type of enterprise storage system. These implementations are particularly advantageous when used in combination with an SBG system in which gaming machines may change game themes much more frequently than in the past, because at least some of the contents of a gaming machine's non-volatile memory will be purged when the gaming machine changes its game theme.

However, the present invention is not limited to SBG implementations. Some aspects of the invention may be implemented, for example, on stand-alone gaming machines, on networked gaming machines that do not use an SBG-type topology, on host devices that are not part of a gaming network, etc.

Exemplary System Architecture

One example of a network topology for implementing some aspects of the present invention is shown in FIG. 1. Those of skill in the art will realize that this exemplary architecture and the related functionality are merely examples and that the present invention encompasses many other such embodiments and methods. Here, for example, a single gaming establishment 105 is illustrated, which is a casino in this example. However, it should be understood that some implementations of the present invention involve multiple gaming establishments.

Gaming establishment 105 includes 16 gaming machines 2, each of which is part of a bank 110 of gaming machines 2. It will be appreciated that many gaming establishments include hundreds or even thousands of gaming machines 2, not all of which are included in a bank 110. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 125, which combines switching and routing functionality in this example) and/or the inclusion of other network devices not shown in FIG. 1. For example, some implementations of the invention include one or more middleware servers disposed between gaming machines 2 and server 130. Such middleware servers can provide various useful functions, including but not limited to the filtering and/or aggregation of data received from bank switches 115, from individual gaming machines and from other player terminals. Some implementations of the invention include load balancing methods and devices for managing network traffic.

Each bank 110 has a corresponding bank switch 115, which may be a conventional bank switch. Each bank switch is connected to SBG server 130 via main network device 125, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of server-based gaming ("SBG"). IGT has also developed a gaming-industry-specific transport layer called CASH that rides on top of TCP/IP and offers additional functionality and security.

SBG server 130, License Manager 131, Arbiter 133 and main network device 125 are disposed within computer room 120 of gaming establishment 105. License Manager 131 may be implemented, at least in part, via a server or a similar device. SBG server 130 can be configured to implement, at least in part, various aspects of the present invention. Some preferred embodiments of SBG server 130 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 131 and main network device 125) are mounted in a single rack with SBG server 130. Accordingly, many or all such devices will sometimes be referenced in the aggregate as an "SBG server." However, in alternative implementations, one or more of these devices is in communication with SBG server 130 but located elsewhere. For example, some of the devices could be mounted in separate racks within computer room 120 or located elsewhere on the network.

SBG server 130 preferably has an uninterruptible power supply ("UPS"). The UPS may be, for example, a rack-mounted UPS module.

Computer room 120 may include one or more operator consoles or other host devices that are configured for communication with SBG server 130. Such host devices may be provided with software, hardware and/or firmware for implementing various aspects of the invention; many of these aspects involve controlling SBG server 130. However, such host devices need not be located within computer room 120. Wired host device 160 (which is a laptop computer in this example) and wireless host device (which is a PDA in this example) may be located elsewhere in gaming establishment 105 or at a remote location.

Moreover, other storage devices may be located in computer room 120 or elsewhere on the network. Some implementations of the invention provide for at least some of the contents of gaming machine's non-volatile memory to be transmitted over a network and stored in a device other than the gaming machine, such as a server, a disk array such as a such as a redundant array of inexpensive disks ("RAID"), etc. In some embodiments, the device is within a network attached storage ("NAS") system, a storage area network ("SAN") or another type of enterprise storage system.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 1A:
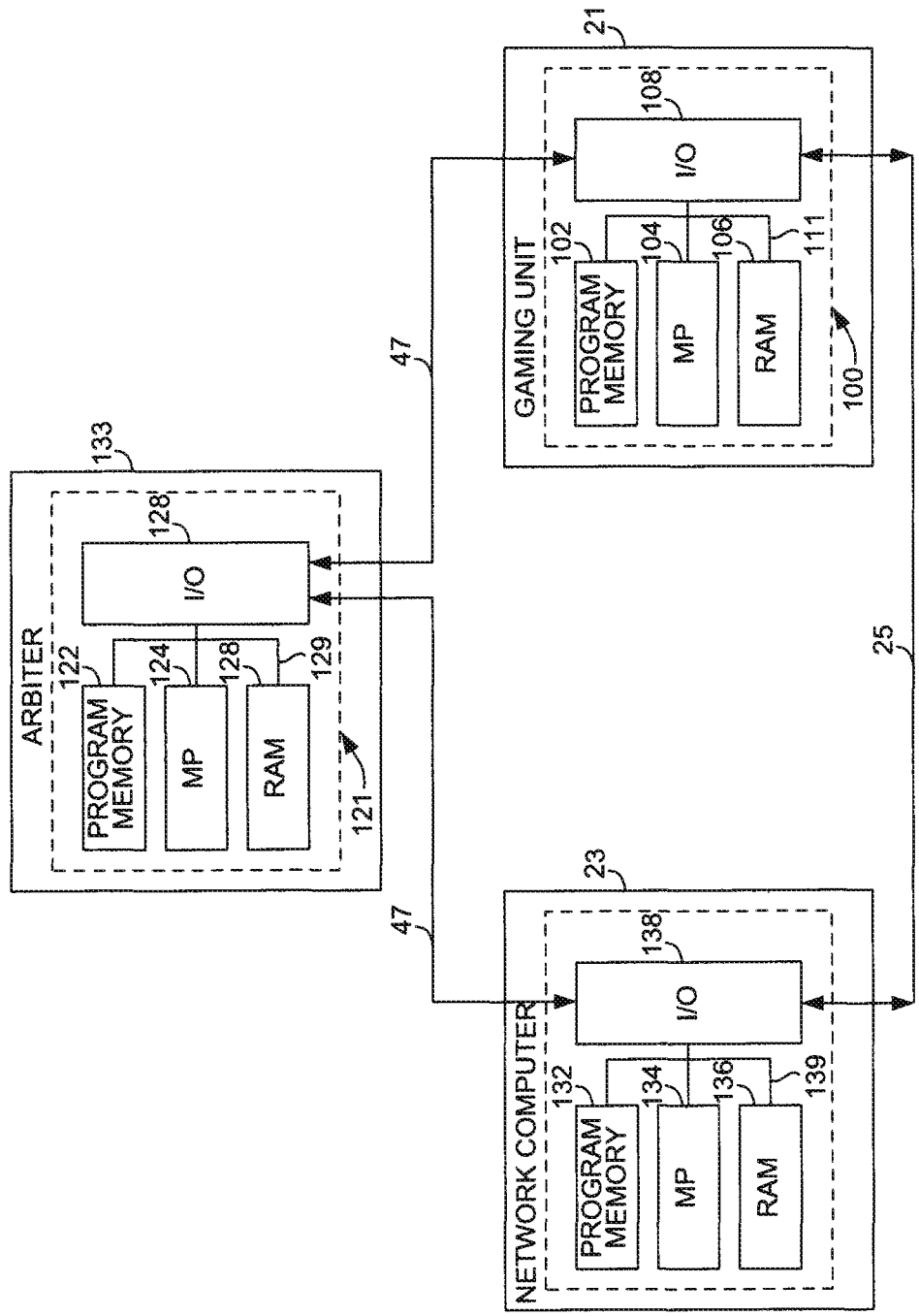
FIG. 1A is a block diagram that illustrates a simplified network topology that illustrates some implementations of an Arbiter.

As shown in FIG. 1A, a gaming unit 21 may be operatively coupled to a network computer 23 (such as SBG server 130 of FIG. 1) via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity, resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each networked gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for implementing some aspects of the invention. Such wireless devices could include, but are not limited to, laptops, PDAs or even cellular telephones. Referring once again to FIG. 1, it should be noted that one or more network devices in gaming establishment 105 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 105 and the outside world should only be made with trusted devices via a secure link, e.g., via a virtual private network ("VPN") tunnel. For example, the illustrated connection between SBG 130, gateway 150 and central system 163 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be found from the VPN Consortium, an industry trade group (http://www.vpnc.org, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Providing a secure connection between the local devices of the SBG system and IGT's central system allows for the deployment of many advantageous features. For example, a customer (e.g., an employee of a gaming establishment) can log onto an account of central system 163 (in this example, IGT.com) to obtain the account information such as the customer's current and prior account status.

Moreover, such a secure connection may be used by the central system 163 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described elsewhere herein.

Automatic updates of a customer's SBG server may also be enabled. For example, central system 163 may notify a local SBG server regarding new products and/or product updates. For example, central system 163 may notify a local SBG server regarding updates of new gaming software, gaming software updates, peripheral updates, the status of current gaming software licenses, etc.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 163 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 163 and the gaming establishments.

Figure 2:
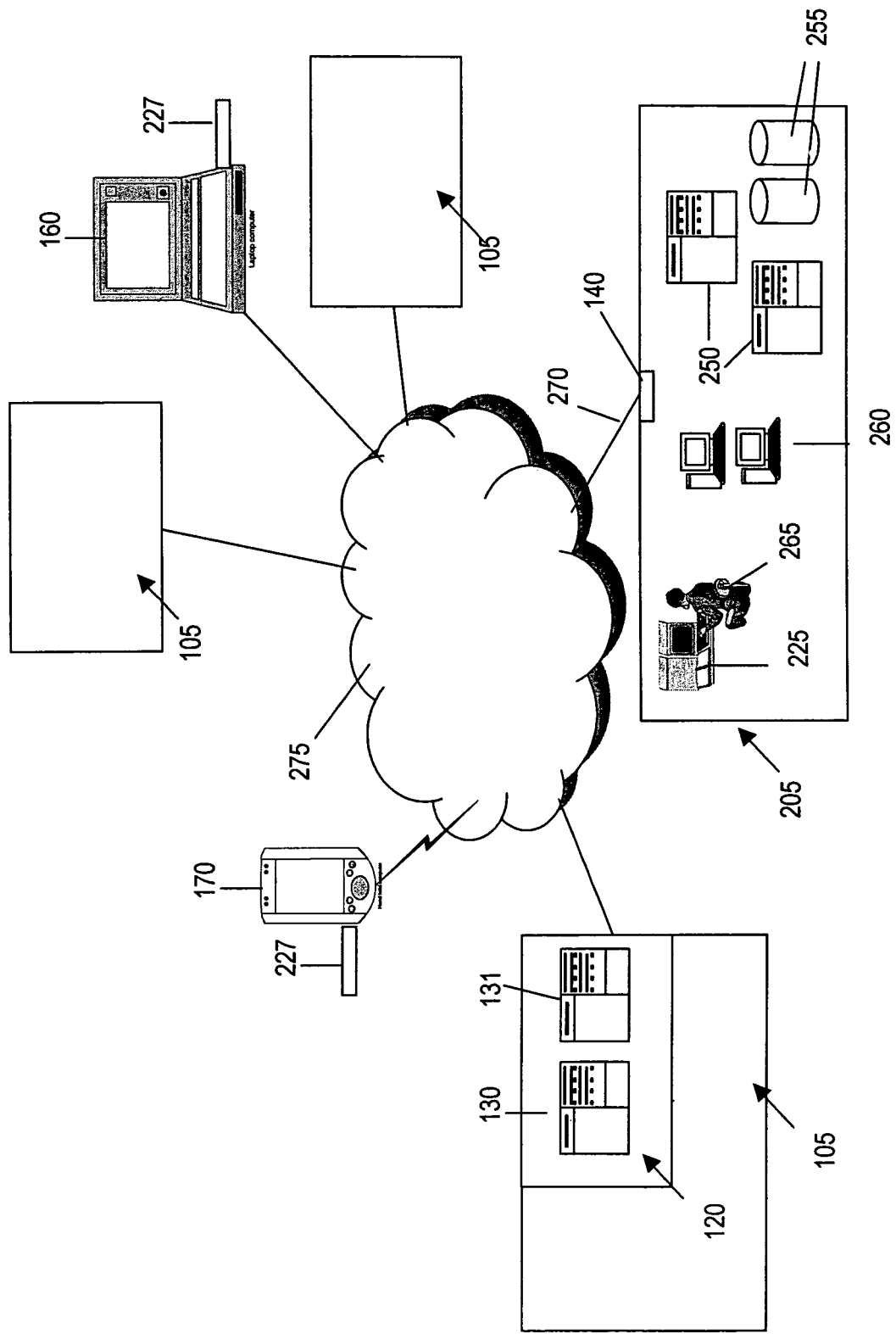
FIG. 2 is a network diagram that illustrates various features that may be used to implement some aspects of the invention.

Referring now to FIG. 2, central system 205 preferably includes servers 250, storage devices 255 and host devices 260. Various operators 265 may be available for, e.g., operating one or more of these devices, answering the telephone and operating one or more devices 225. According to some implementations, at least one of devices 225 may be used as workstations for providing the authentication tokens described in the License Manager Application. In preferred implementations, devices 225 do not actually manufacture the authentication tokens themselves, but instead prepare, initialize and register the tokens.

Preferably, EGM software is also processed by central system 205. As noted Ain the License Manager Application, a public key may be embedded in the EGM software by central system 205. The EGM software provided to customers preferably allows a customer's EGMs to make challenge requests and evaluate responses to challenge requests.

In the example of FIG. 2, central system 205 is configured for communication with various gaming establishments 105 via network 275. Central system 205 is also configured for communication with host devices 160 and 170, each of which has an attached authentication token 227 in this example. According to some implementations of the invention, a customer could retrieve data from another device on the network via host device 160 or 170 (e.g., from one of storage devices 255 or servers 250 in central system 205, from SBG server 130, License Manager 131 or another device in one of gaming establishments 105), order new licenses, etc., even when the host devices are not communicating from within a known gaming establishment 105.

In some implementations of the invention that are described in more detail below, host device 160 or 170 could be used by a casino operator, a gaming agent, etc., to retrieve game information that has been uploaded from non-volatile memory of a gaming machine. This game information could be used to troubleshoot an observed problem with the gaming machine, to evaluate a contested claim of a prize won on the gaming machine, etc. For example, by running emulation software of the present invention, host device 160 or 170 could emulate a condition of that gaming machine, e.g., a display, at a time during which a jackpot was allegedly won on the gaming machine.

Link 270 should have ample bandwidth and may, for example, comprise one or more T1 or T3 connections and/or satellite links having comparable bandwidth, etc. Network 275 is the Internet in this example. However, it will be understood by those of skill in the art that network 275 could include any one of various types of networks, such as the public switched telephone network ("PSTN"), a satellite network, a wireless network, a metro optical transport, etc. Accordingly, a variety of protocols may be used for communication on network 275, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

Gaming Machine

Figure 3:
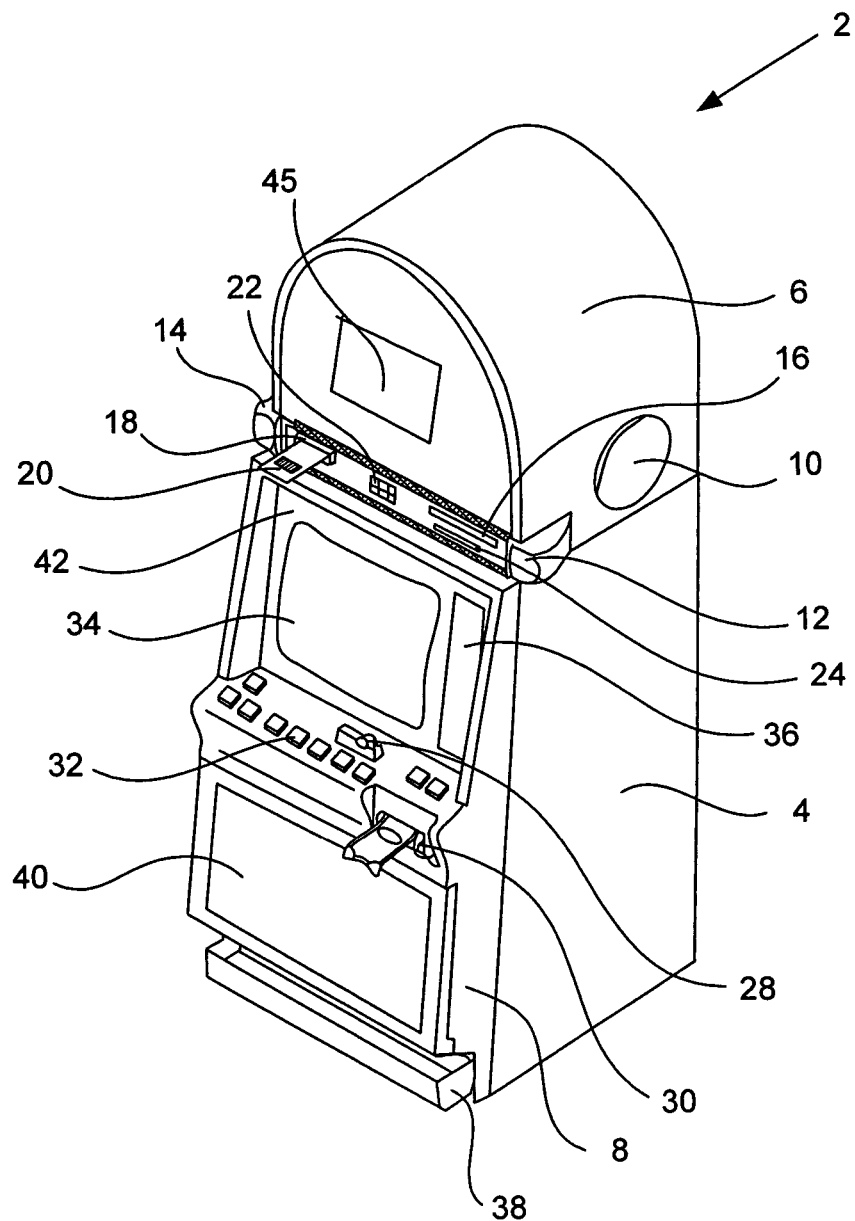
FIG. 3 illustrates a gaming machine that may be configured according to some aspects of the invention.

Turning next to FIG. 3, a video gaming machine 2 is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 3. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's NetPlex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 3, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In order to run both legacy and native games on the same processor, it will often be necessary to provide software emulation functionality. Such emulation will be necessary if the legacy processor and the new processor do not share a common instruction set, which will often be the case if the processors are not in the same family. As will be appreciated by those of skill in the art, an instruction set describes the aspects of a computer architecture visible to a programmer, such as the instructions, registers, addressing modes, memory architecture, interrupt and exception handling, etc. An instruction set includes all binary codes (sometimes referred to as "opcodes") that are the native form of commands implemented by a particular CPU design. The set of opcodes for a particular instruction set is also known as the "native language" or "machine language" of the CPU.

Every CPU has its own machine language, although there is considerable overlap between some. If CPU "A" understands the full language of CPU "B" A is compatible with B. However, CPU B may not be compatible with CPU A, because A may understand opcodes that B does not. This is often the case when CPU A is a more advanced member of a processor family that includes CPU B. For example, Intel states in its literature that the Intel Pentium 4 processor can execute any opcode that ran on the original 8088 processor (about 5,000 times faster). However, the 8088 could not execute all opcode that can run on the Pentium 4, but only a subset of this opcode.

However, the i960 processor has no modern family member comparable to the Pentium 4. Therefore, legacy gaming software that was written and compiled for an i960 processor will not run on a modern processor without some form of emulation. As mentioned elsewhere herein, IGT has a large library of legacy "960" gaming software of this kind. Accordingly, some implementations of the invention provide emulation software that allows such legacy gaming software to be executed on a gaming machine that has a different CPU and/or has different peripheral devices than the gaming machines for which the legacy gaming software was written.

Figure 4:
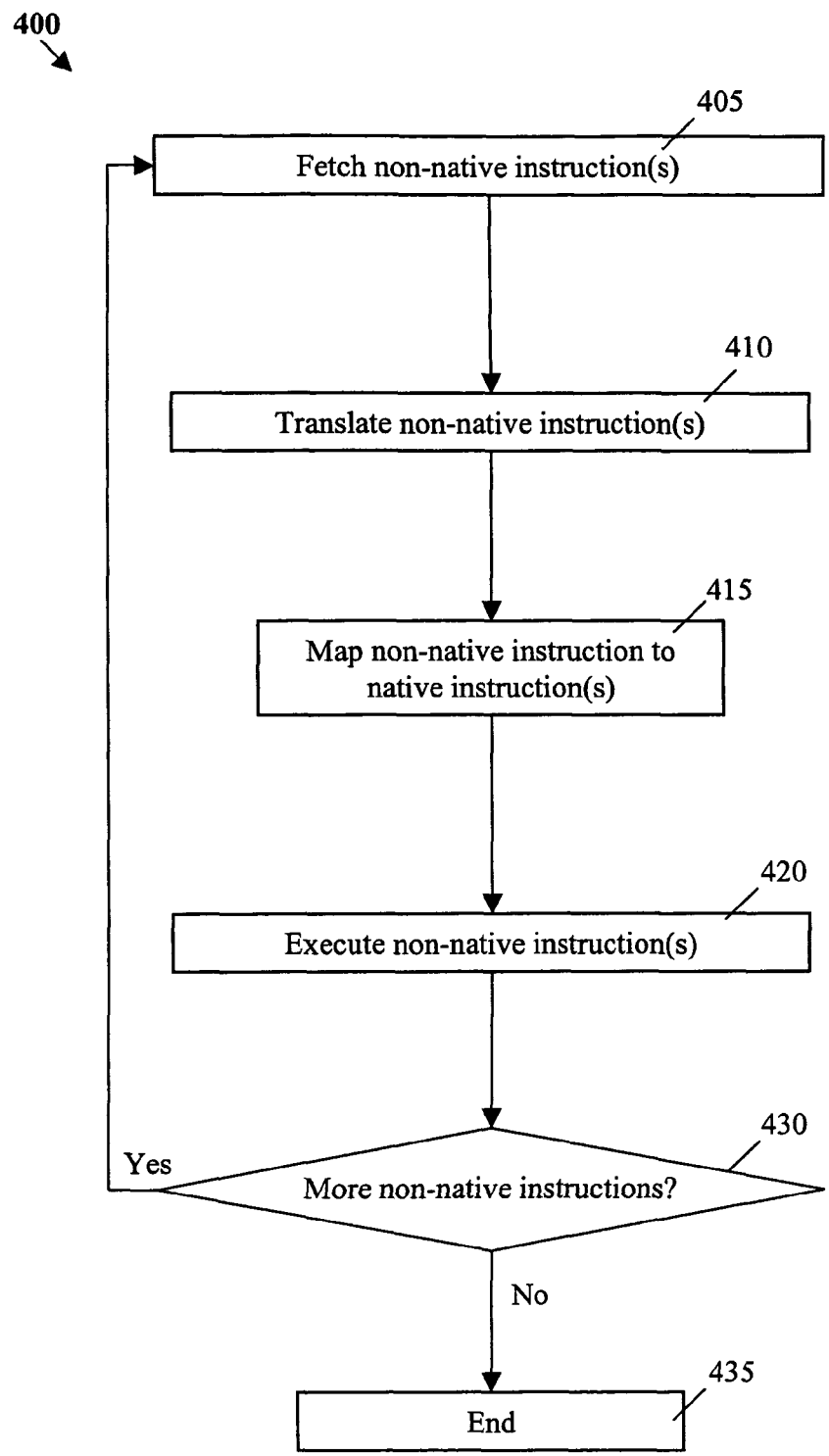
FIG. 4 is a flow chart that outlines a method according to some aspects of the invention.

FIG. 4 is a flow chart that illustrates the broad contours of one such emulation method 400. In step 405, one or more non-native instructions of compiled gaming software are fetched. Such instructions could be, for example, from a legacy 960 game. In steps 410 and 415, the non-native instructions are translated and mapped to instructions from the new CPU's instruction set, if necessary. As noted above, such a mapping will not always be necessary, because the instruction(s) fetched could be in both the instruction set of the currently-used CPU and the instruction set of the CPU for which the gaming software was written. In step 420, the instruction(s) will be executed.

In step 430, it is determined whether there are any more non-native instructions to be fetched. For example, if the game has been completed, the method proceeds to step 435 and ends. If there are additional non-native instructions to be fetched, the method returns to step 405 and proceeds.

Figure 5:
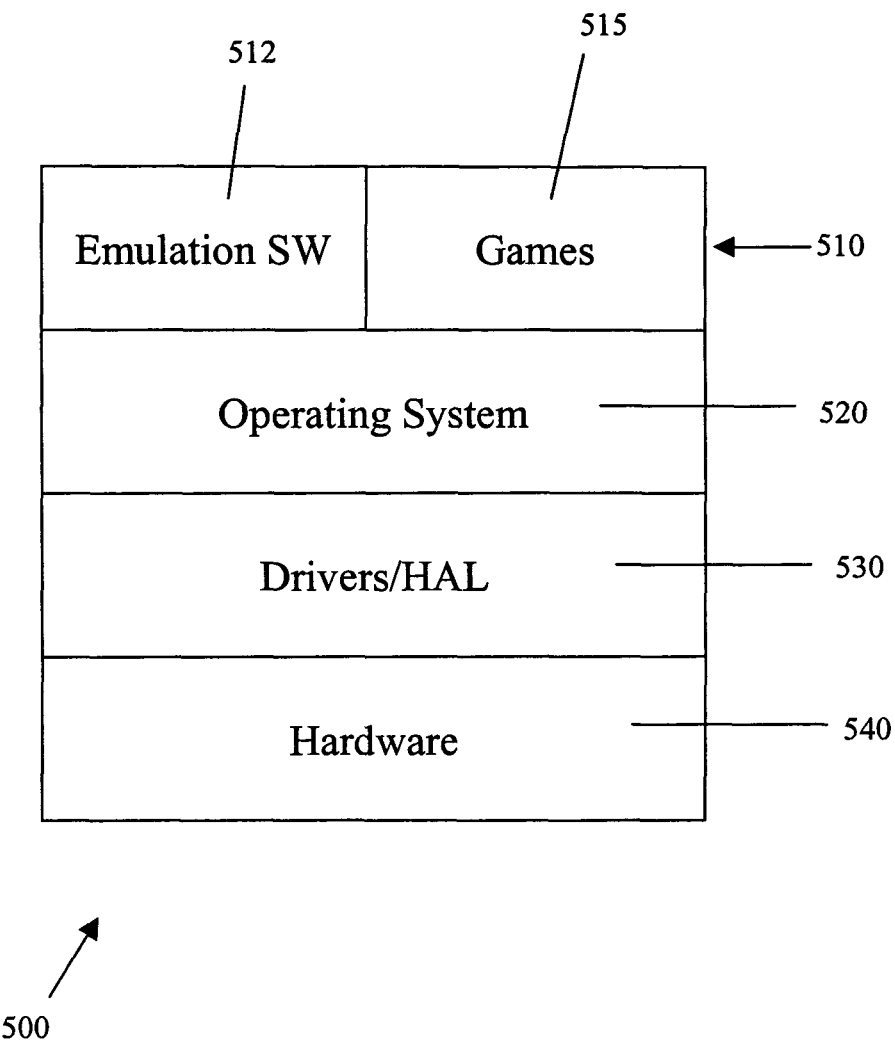
FIG. 5 is a block diagram of software and hardware according to some aspects of the invention.

FIG. 5 illustrates stack 500, which represents various software layers that can be used to implement some emulation-based aspects of the invention. In this stack, application layer includes emulation software 512 and game software 515. In some implementations of the invention, game software 515 includes both non-native games, such as legacy games, and native games. Here, the non-native games and the native games can run on the same operating system 520. Between hardware layer 540 and operating system 520 is layer 530, which includes drivers and may include a hardware abstraction layer ("HAL"), the latter of which is described in more elsewhere herein.

Preferred implementations of the invention implement layer 530 as software rather than hardware, for increased portability and flexibility. Implementing both the emulation software 512 and layer 530 allows gaming software to be ported to a variety of different devices, including host devices such as devices 160 and 170 of FIGS. 1 and 2.

Emulation software 512 allows legacy software to run on a platform (computer architecture and/or operating system) other than the platform for which the legacy software was written. For example, emulation software 512 allows the legacy software to run on a more modern gaming machine platform that includes a more powerful processor as compared to the legacy processor (e.g., an i960 processor). Emulation software 512 reproduces the behavior of the legacy platform on game CPU 455 by accepting the same data, interpreting and translating data, executing the same programs, and achieving the same results that are expected by the legacy software.

Here, emulation software 512 only emulates a hardware architecture and the same operating system 520 is used for both native games and non-native games. However, in some implementations, a different operating system may be required for non-native software and the native software. In some such implementations, both the non-native operating system and the non-native game software will be interpreted by the emulation software 512.

Figure 6:
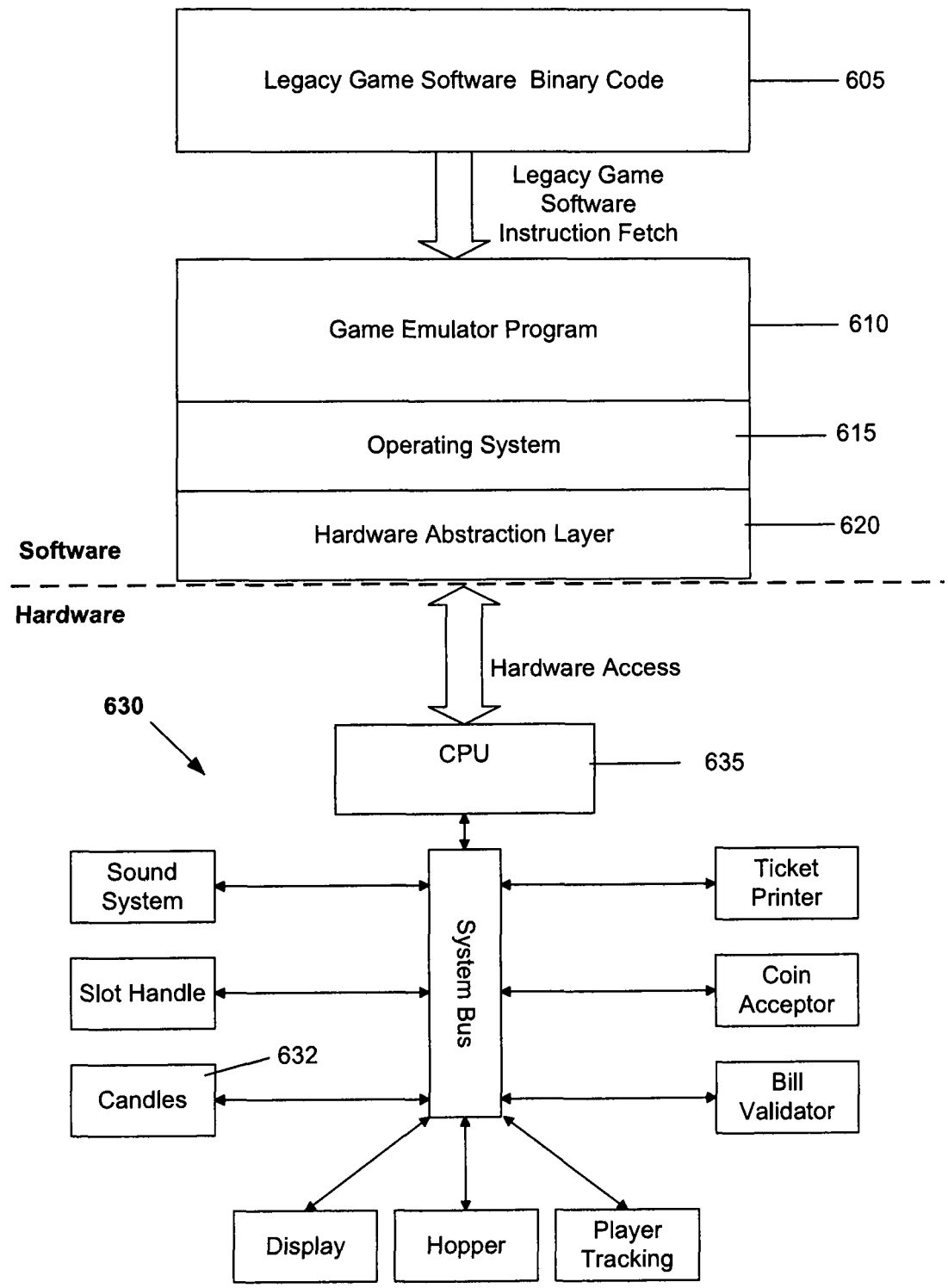
FIG. 6 is a block diagram of software and hardware according to some aspects of the invention.

FIG. 6 is a block diagram that illustrates the interrelationships between certain types of hardware and software according to some implementations of the invention. Here, legacy game software 605, game emulator program 610 and operating system 615 are stored in one or more storage devices of a gaming machine. In this example, native game code for the gaming machine's CPU is in the same software layer as game emulator 610.

Operating system 615 hosts programs, including game emulator program 610, as applications. Operating system 615 could be, for example, Windows XP, Linux, or any suitable operating system.

Game emulator 610 handles the execution of legacy game software 605 on CPU 635, which is disposed in a gaming machine in this example. As noted elsewhere herein, alternative implementations of the invention involve configuring other types of devices, such as host devices 160 and/or 170, for gaming software emulation. Some exemplary functionality of game emulator 610 will be described below.

In this example, HAL functionality is performed by software. HAL software 620, which is operating system independent, enables access to at least some of hardware components 630. HAL software component 620 can function as a buffer between the operating system and hardware components 630 and allows the operating system 615 to be changed without changing a HAL hardware component.

Accordingly, HAL software component 620 functions in some respects like a device driver. When a hardware element (e.g., a display, a bill acceptor, etc.) is upgraded or otherwise changed, HAL software component 620 will need to be modified.

When a particular legacy game needs to be run, game emulator 610 opens the binary code for that game and loads the binary code into a memory (such as an SDRAM) for execution by game CPU 635. One of the important roles of game emulator 610 is processing hardware access requests from legacy game software 605 into native hardware access. If the legacy game software wanted to activate one of the hardware components 630 of a gaming machine, legacy game software 605 would write to a particular address. In some instances, the target hardware of the legacy gaming machine platform will correspond with hardware of the new gaming machine platform and in some instances there will be no such correspondence.

In a first example, a hardware access requests from legacy game software 605 relates to a peripheral device that is featured on both the legacy gaming machine and the gaming machine that is running game emulator 610. If legacy game software 605 wanted to turn on one of candles 632, legacy game software 605 would write to a particular address. Game emulator 610 would determine, based on that address, that the legacy game wanted to illuminate one of candles 632. Game emulator 610 would make an API call, via operating system 615 and HAL 620, to access the candle.

Figure 7:
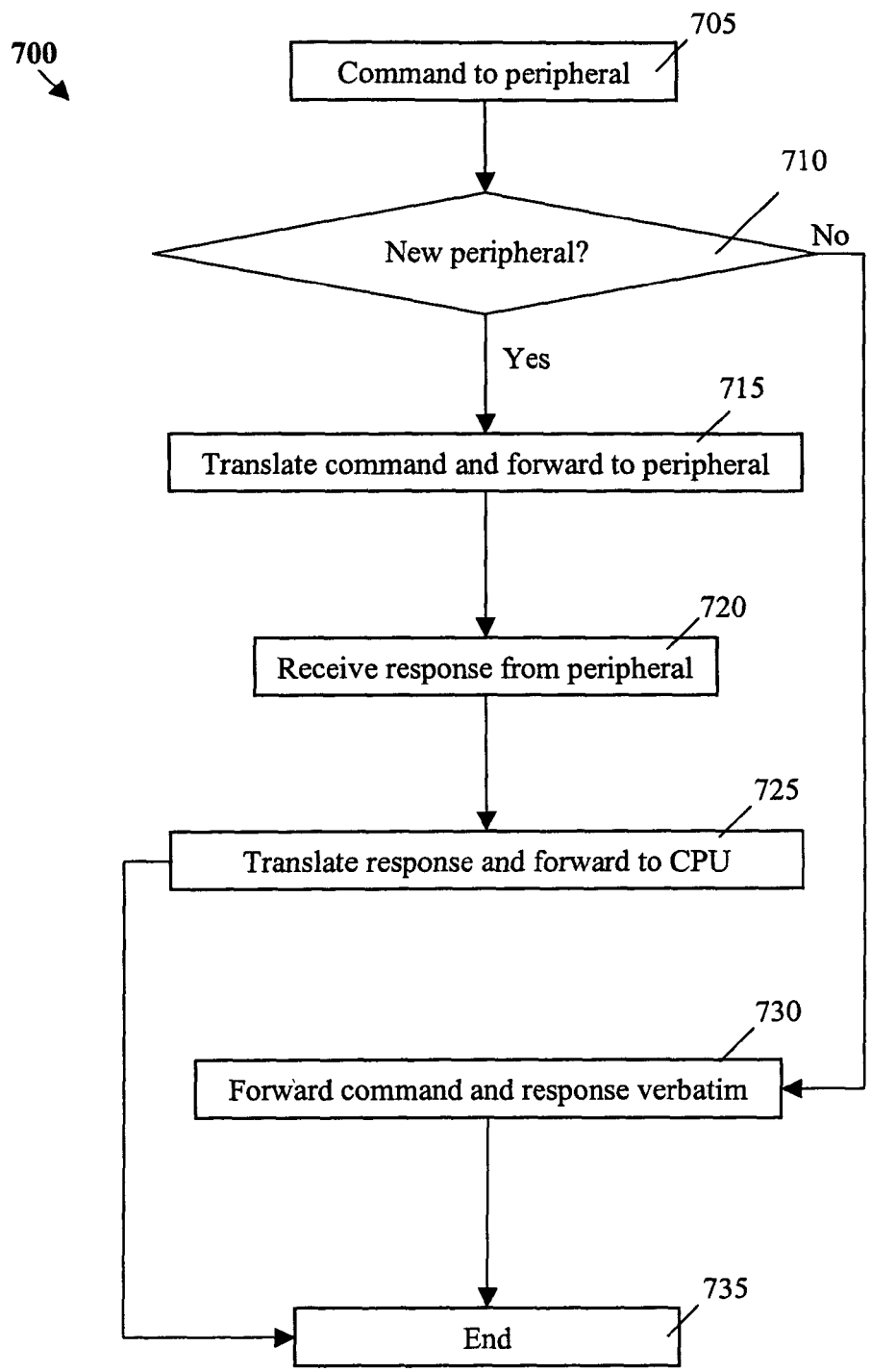
FIG. 7 is a flow chart that outlines a method according to some aspects of the invention.

However, it will often be the case the a new gaming machine will not include all of the peripherals for which hardware access requests will be made by legacy game software 605. FIG. 7 is a flow chart that outlines method 700 for addressing this issue, according to one exemplary implementation of the present invention. In step 705, legacy gaming software gives a command to a peripheral in response to an event that takes place during a game. In this example, the command is to make a light flash on the gaming machine. In step 710, it is determined whether the peripheral to which the command is directed is part of the gaming machine that is running the emulator software. If the peripheral is still in use (and if the same communication protocol is being used for communication with that peripheral), the command is forwarded to the peripheral verbatim (step 730). Similarly, any response from the peripheral is forwarded back to the CPU without change.

However, in this example, the light to which the command is directed is not in use on the new gaming machine. Accordingly, the command is translated before it is forwarded. (Step 715.) In this example, a HAL provides an interface with a new gaming machine that no longer includes the light. However, the new gaming machine has a video display. Therefore, the HAL translates the command to make the light flash into a command to produce an interesting video display (a flashing screen, an interesting image, a text message, etc.) (Step 715.) In step 720, the display returns a response indicating that the interesting video display has been produced. In step 725, the HAL returns a response to the CPU indicating that the light is flashing.

Figure 8:
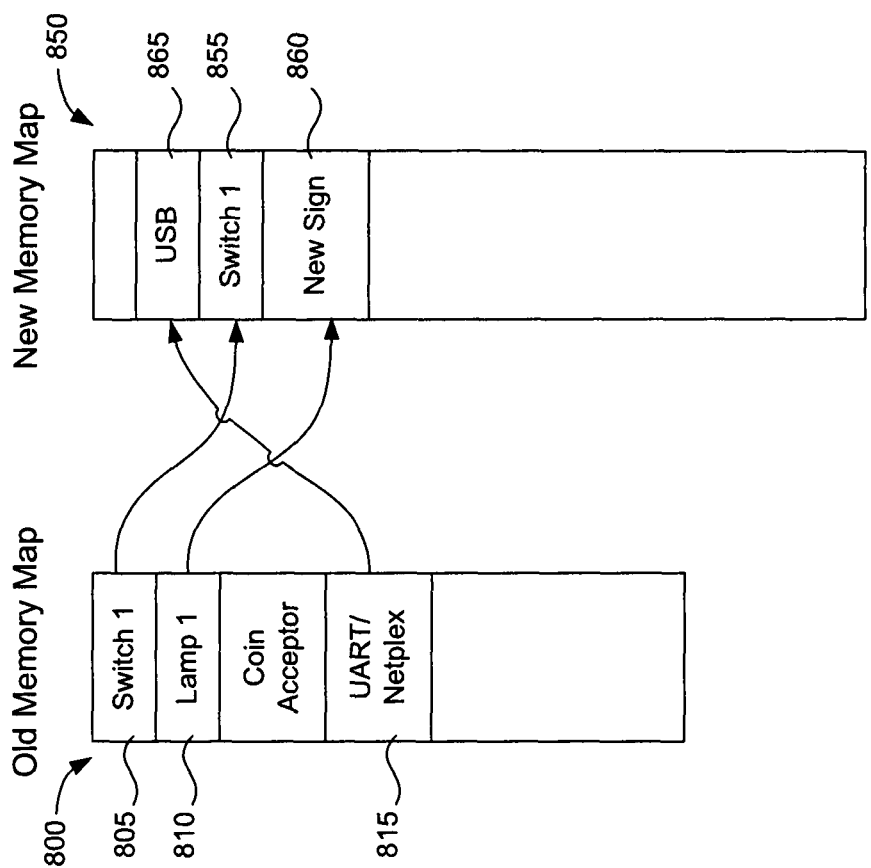
FIG. 8 illustrates some memory mapping methods of the invention.

Some preferred implementations of the invention use memory mapping to facilitate the translation referenced above in step 715. This is one way to implement a translation of commands relating to old hardware into commands relating to existing hardware. Some such memory mapping techniques are illustrated in FIG. 8.

The legacy opcode for a memory access is known. The operand of the opcode is the location/address for the memory access. In some cases, the memory access will relate to a peripheral device that still exists or at least has a close analog on the new machine. However, the address will relate to architecture of the legacy gaming machine, so the address for the memory access will need to be translated into an address that is relevant to the new architecture. For example, if a memory access request is received for memory address 805 of the old architecture, this will be recognized (by emulator 610 and/or HAL 620) as a request relating to Switch 1. In this example, there is a corresponding Switch 1 on the new platform, so the memory access request that was received for memory address 805 will be translated into a request for address 855.

In some cases, the memory access request will relate to a peripheral device that does not exist on the new machine. For example, if a memory access request is received for memory address 810, the legacy gaming software is attempting to activate Lamp 1, which is not a part of the new gaming platform. Therefore, a memory access request that is received for memory address 810 will be translated into a request for memory address 860, which will activate a new sign that flashes the message, "You're a Winner!"

Figure 9:
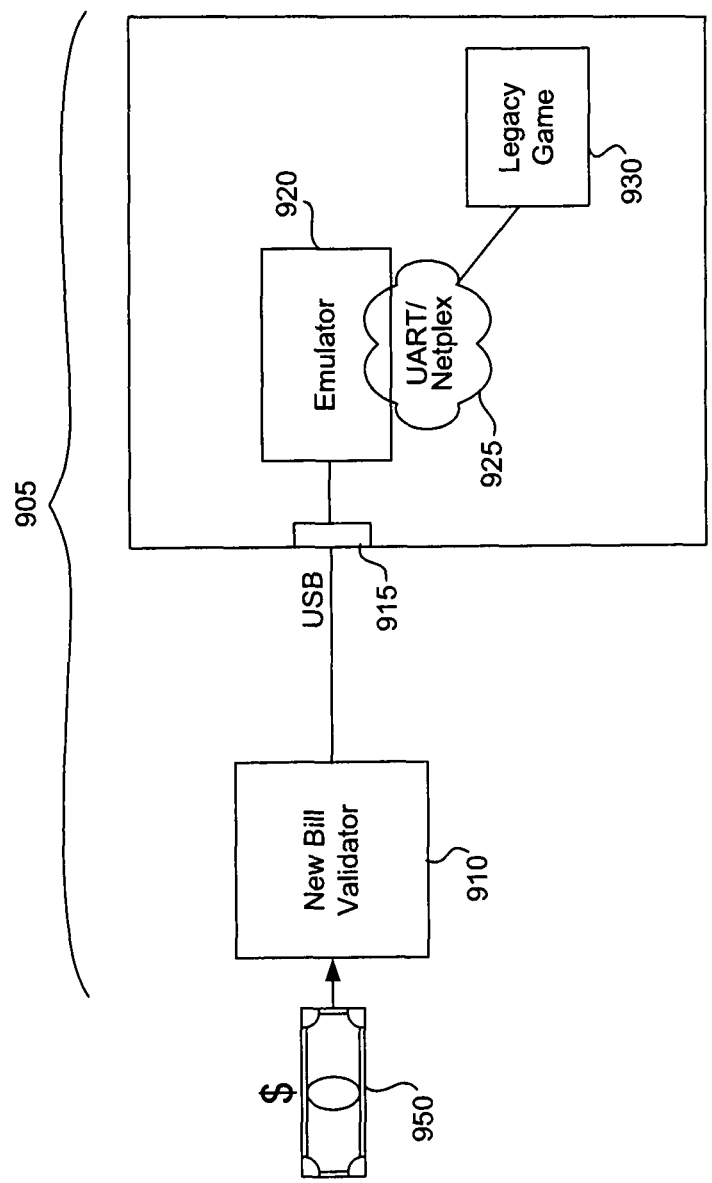
FIG. 9 illustrates some emulation methods of the invention.

Memory address mapping may also facilitate upgrades/changes in interfaces and corresponding protocols. Referring now to FIG. 9, if a $5 bill 950 is inserted into the new bill validator 910, a signal will be transmitted to emulator 920 (here, via a USB connection 915 that did not exist at the time legacy game 930 was written) and emulator 920 will store this indication in memory address 865 (see FIG. 8). A memory access request that is received for memory address 815 will be interpreted as a request by the legacy game 930 to determine whether any bills have been inserted into the legacy bill validator. In this example, legacy game 930 tries to poll a non-existent UART/NetPlex serial interface that formerly allowed communication with a bill validator; this interface is now a virtual interface 925 provided by emulator 920. At this point, the emulator maps address 815 to address 865 (see FIG. 8) and returns a response to legacy game 930 according to the old protocol (via software simulation) indicating that a $5 bill has been inserted.

In this example, emulator 920 needs to monitor both the virtual UART/NetPlex interface 925 provided for legacy game 930 and the physical USB interface 915 of the new gaming machine, according to the respective protocols. The emulator 920 needs to understand, for example, that a certain stream of bytes means that the legacy game is asking whether a bill has been received by the bill acceptor according to the NetPlex protocol. Emulator 920 must also know how to interpret, for example, a "bill received" indication from the physical USB interface 915 according to the USB protocol. Such an indication would be stored in a holding place in memory until the legacy game 930 asks whether a bill has been received by the virtual bill acceptor 925.

There does not need to be a 1 to 1 correspondence for the memory mapping process. For example, modern gaming machines may include additional instances of known hardware and/or interfaces. If, for example, there are additional door monitoring I/O lines in the new gaming platform, this means that there are doors being monitored that the legacy games would not know about. Some implementations of the invention map more than one of these I/O lines to the same memory space (e.g., input from 2 doors could be mapped to the same memory space known by the legacy CPU to correspond with a single door). However, this is merely an example; any old feature can be mapped to any new feature.

Some implementations of the invention, allow a CPU have 2 modes of operation, "emulation mode" and "native mode." When running native game software that requires no emulation, the CPU is running in native mode. Accordingly, emulation software need not be enabled. When running non-native game software that requires emulation, emulation software is enabled.

Figure 10:
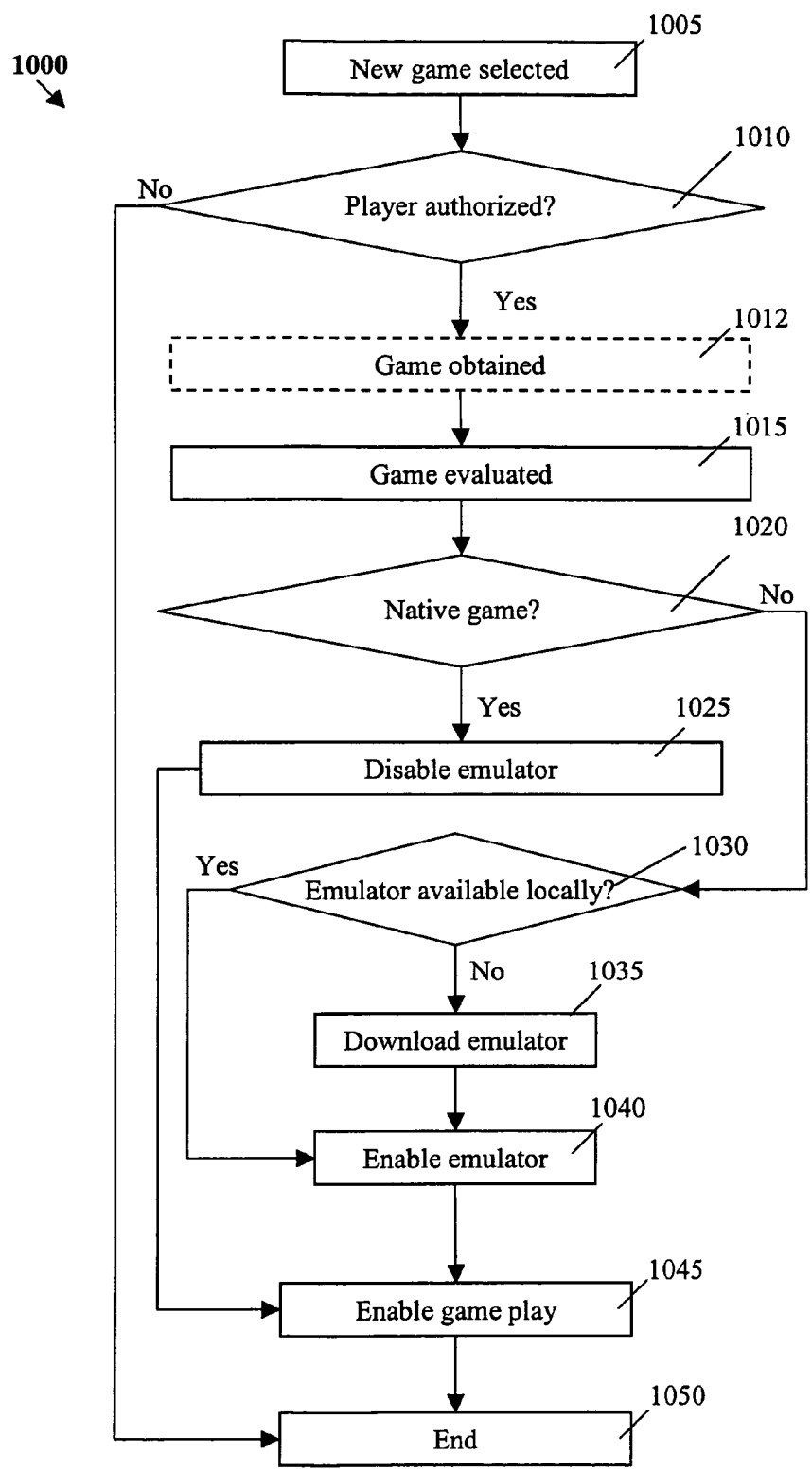
FIG. 10 is a flow chart that outlines a method according to some aspects of the invention.

Method 1000 of FIG. 10 outlines one such implementation of the invention. In step 1005, a new game is selected, e.g., when a player touches an area of a touchscreen that corresponds with a desired game.

In step 1010, it is determined whether the player is authorized to play the game. Step 1010 may involve any of various processes, including a determination of whether the player has inserted indicia of credit into a gaming machine, determining whether a player is in a jurisdiction wherein the selected game may be played, etc. In some implementations, it will be determined in step 1010 that some aspects of a game may be played in a jurisdiction but others may not. Accordingly, some features may be enabled or disabled, according to the jurisdiction. For example, if a particular type of bonus feature is not legal in New Jersey, the player's jurisdiction, then the bonus feature will be disabled. U.S. patent application Ser. No. 11/155,052, entitled "Universal System Mediation Within Gaming Environments" and filed Jun. 17, 2005, describes relevant methods and devices and is hereby incorporated by reference.

If the player is not authorized to play the game, the process ends (step 1040). The player may choose to select another game (step 1005) and try again.

If the player is authorized to play the game, the game is obtained, if necessary, in step 1012. For example, if the game is not already stored in a local memory, the game may be downloaded from a game server, from a portable memory device, etc. In step 1015, the selected game is evaluated to determine whether the game may be run in native mode or whether it will need to be run in a non-native mode requiring emulation. "Non-native" games may include both legacy games, as described elsewhere herein, and also games that were simply written for another type of gaming machine. In some implementations, non-native games include games written for execution on a gaming machine produced by another company. For example, some such implementations allow for an IGT gaming machine to run not only IGT games, but also to run Bally games, WMS games, Aristocrat games, etc.

In some implementations, a header or a flag in the game file indicates whether the game should be run in native mode or in emulation mode. However, an indication of whether the game should be run in emulation mode may be an express indication or an implied indication. For example, non-native software may have certain characteristics that would not be found in native software and vice versa. For example, a native game may communicate with a printer via a USB connection, whereas a non-native game may use NetPlex.

In step 1020, a determination is made, based on the evaluation in step 1015, as to whether the game is a native game or a non-native game. If the game is a non-native game, it is determined whether emulation software is locally available for running the non-native game. (Step 1030). If appropriate emulation software is locally available, that software is enabled. (Step 1040.) If the proper emulation software is not locally available, the software is downloaded (step 1035) and then enabled (step 1040). The proper type of emulation software may be determined, for example, by a gaming server according to information from the gaming machine indicating what type of CPU it uses, what peripherals it has, etc.

As noted above, some implementations of the invention provide for gaming software from various sources, including gaming software that has been provided by different companies, to be run on the same gaming machine. Accordingly, it will sometimes be the case that gaming software and emulation software will be downloaded from different servers using different communication protocols. For example, IGT typically uses the SuperSAS® protocol for communications between servers and gaming machines, whereas other companies may use Best of Breeds ("BOB") protocol or another protocol. U.S. patent application Ser. No. 11/155,052, which has been incorporated by reference, describes relevant methods and devices. Depending on the hardware configuration expected by the non-native game, other forms of emulation may be required, such as emulation that may be provided by a HAL in some implementations.

However, if it is determined in step 1020 that the game is a native game, emulation software is not enabled. Either way, game play is enabled in step 1045. It will be appreciated that having the flexibility of playing both native and non-native games on the same gaming machine offers a player a great deal of flexibility and a great many options, particularly if the gaming machine can download selected games and emulation software.

In a similar fashion, non-native code can be run even without the peripheral devices for which the code was written. In some such implementations, peripheral mediation hardware and/or software may be required. In some such implementations, peripheral mediation software may be downloaded as needed, e.g., as described above with reference to FIG. 10. For example, if a gaming server receives a request to play a game involving a joystick from a gaming machine that does not have a joystick, the gaming server may determine whether the gaming machine has other features (e.g., left/right and up/down buttons, or similar features) that could be used in lieu of the joystick. If so, the corresponding peripheral mediation software can be provided along with the game. If not, the game will not be provided.

When a game is executing on a gaming machine, game state is preserved by storing various types of information such as game credits, etc., in non-volatile memory (such as NVRAM and/or EEPROM). When a new game starts running on a gaming machine, the contents of non-volatile memory are purged. As SBG is implemented, it is expected that gaming machines will be changing game themes more frequently. It could be, for example, that a gaming machine would run 100 different types of games in a single day. The state of each game is preserved while it is running, but when a new game is running the state information for the old game disappears from NVRAM.

Figure 11:
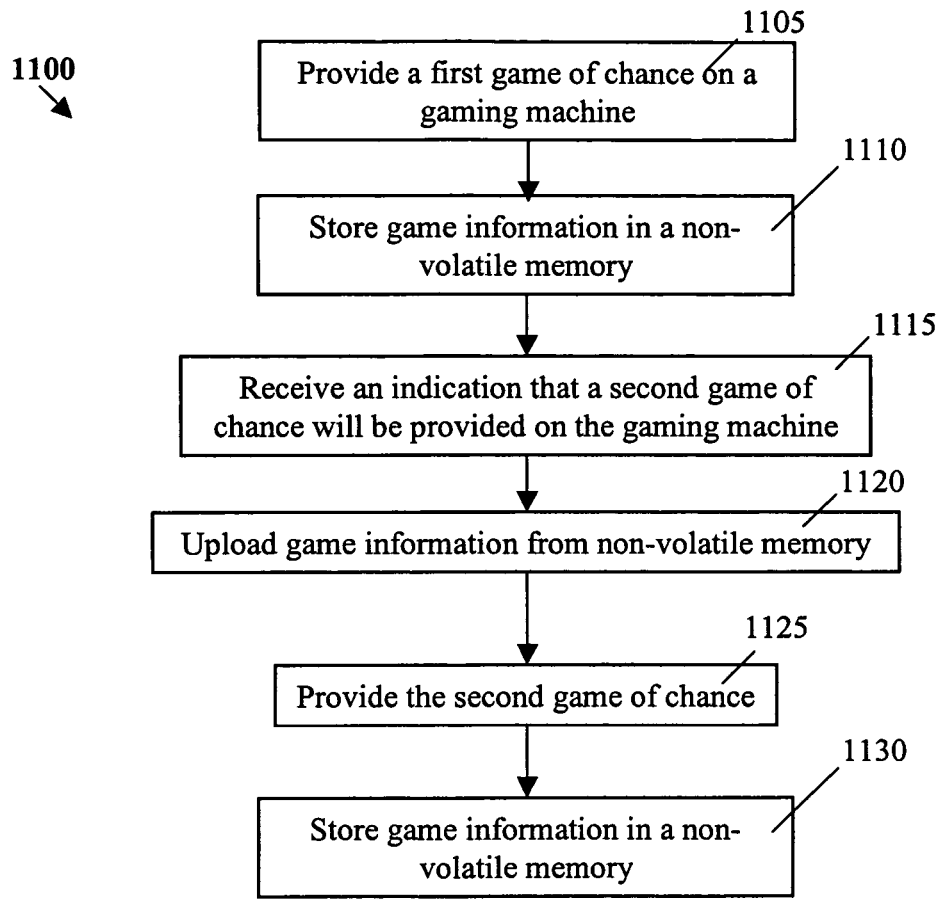
FIG. 11 is a flow chart that outlines a method according to some aspects of the invention.

FIG. 11 outlines method 1100 of the invention for addressing this problem. In step 1105, a first game of chance is provided on a gaming machine. As the game is provided, game information relating to the first game of chance is stored in non-volatile memory (step 1110).

In step 1115, an indication is received that a second game of chance will be provided on the gaming machine. This indication may be received from the player, e.g., by the player's selection of a new game theme by interacting with an input device of the gaming machine (e.g., by touching a display screen). Alternatively, the indication could be from a game server such as SBG server 130 of FIG. 1.

Before the contents of non-volatile memory are purged, at least some of the contents are uploaded to another device via the gaming network. (Step 1120.) The device could be, for example a server, a disk array such as redundant array of inexpensive disks ("RAID"), etc. In some embodiments, the target device is within a network attached storage ("NAS") system, a storage area network ("SAN") or another type of enterprise storage system. Preferably, information such as gaming machine ID, a time stamp, etc., is uploaded along with the game information. In addition to game state information, other game information and/or related information may also be uploaded, e.g., door open information or other security event log information, game credits, etc.

The second game of chance is then provided (step 1125). Game information relating to the second game of chance is stored as before (step 1130).

Figure 12:
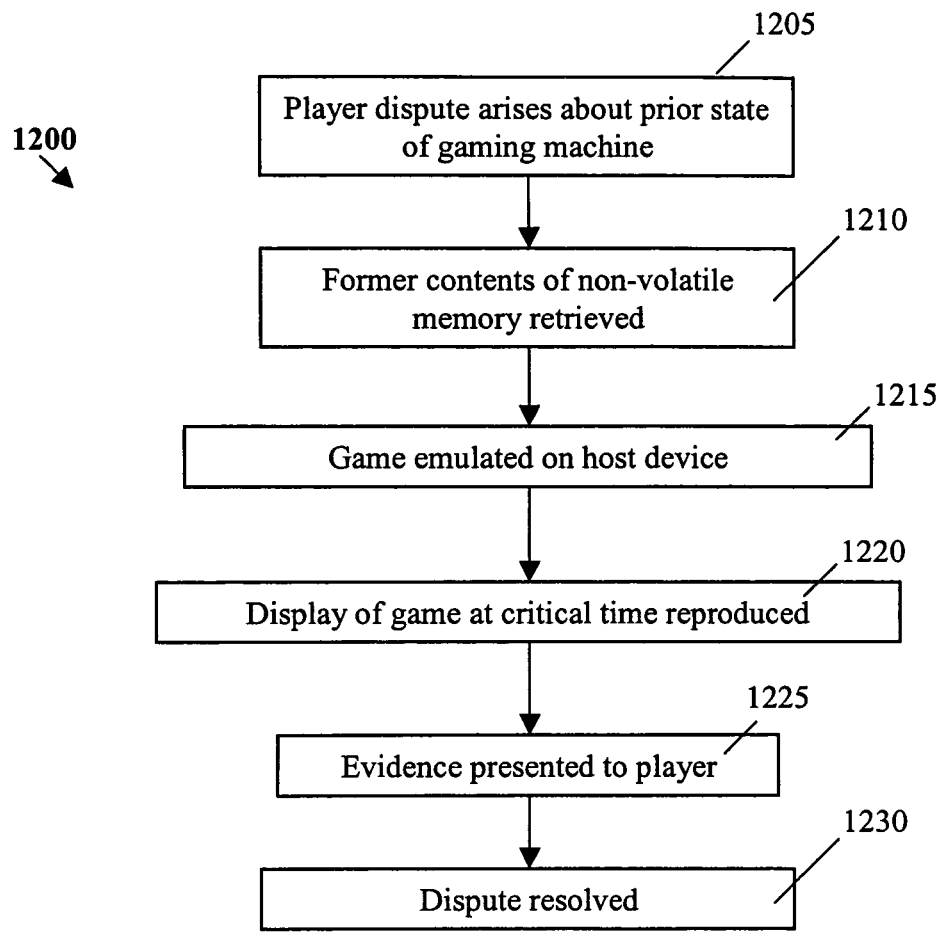
FIG. 12 is a flow chart that outlines a method according to some aspects of the invention.

The stored information may be used for various purposes, such as troubleshooting gaming machines, resolving disputes with players, etc. One related method is shown in FIG. 12. In step 1205, a player dispute arises regarding the former state of a gaming machine. For example, a player may claim to have won a jackpot on game A that was not paid out by the gaming machine. Now, the gaming machine is running another game theme and the information in its NVRAM regarding game A has been purged.

Fortunately, the contents of the gaming machine's non-volatile memory regarding game A were uploaded and stored before being purged. In step 1210, at least some of these data are retrieved. For example, a gaming agent may use a PDA such as host device 170, authenticate the device, locate the pertinent information according to gaming machine ID and time stamp data, and retrieve the pertinent information.

Even if such data had been properly archived, a programmer would normally need to analyze a "RAM dump" and try to determine what was going on. A casino operator would normally need to open up the gaming machine to try to evaluate the player's claim; this could lead to subsequent allegations that the casino operator had tampered with the evidence. Moreover, at present, a gaming agent generally arrives to a scene involving an angry player, casino operators trying to determine what happened, a crowd gathering, etc.

However, according to method 1200, emulator software is executed, the archived contents of non-volatile memory are loaded and the game is emulated on the host device. (Step 1215.) In this example, the gaming agent is able to reproduce displays of the gaming machine while the player was playing game A. (Step 1220.) In essence, the gaming agent and/or a casino operator can "clone" the gaming machine in the exact state that it was on the casino floor at the time of the disputed event.

In this case, after the displays are presented to the player (step 1225), the dispute is resolved. (Step 1230.) However, in some situations, the player will continue to assert his or her claim before a regulatory tribunal or in court. Because a gaming agent and/or a casino operator may use these archived data without tampering with or destroying the relevant evidence, the emulation methods and devices of the present invention may be of considerable benefit during such proceedings. The emulator could show exactly what the gaming machine was displaying to the player, in a format that a lay person can understand. One could also review the security event log to see, e.g., if a gaming machine door was open, whether a player was tampering with a bill stacker, etc.

Other Implementations

In some implementations, an emulator of the present invention may be used to set up groups of gaming machines. Traditionally, to change a gaming machine to run a new game theme, one sends a technician out who swaps out a game EEPROM and goes through menu options (sometimes hundreds of them, including limits, pay tables, etc.) to configure each gaming machine.

With SBG, the game downloads can be done from the server. However, one could use the emulator to test the configuration and see if it works properly before reconfiguring the machines on the casino floor. An operator could set up one machine the way you want it, then configure all the machines (960 and non-960 games) accordingly.

As noted elsewhere herein, one of the differences between gaming machine architecture and personal computer architecture is based on the requirement of "power hit tolerance" for gaming machines. For example, if a player were to win a 100-coin payout and if there was a power failure after the first 50 coins are paid out, the power hit tolerance of a gaming machine would allow it to preserve the state of the gaming machine as it existed just before the power hit. Therefore, after power is restored the gaming machine would re-boot and pay out the other 50 coins.

Implementations of the emulator described herein that are intended for a gaming machine environment maintain the feature of power hit tolerance. The emulator will often be running on devices that execute out of DRAM. These implementations of the emulator map certain areas of legacy game code into memory addresses of a battery-backed RAM or other non-volatile memory on a gaming device. In some such implementations, the emulator causes the CPU to write to a battery-backed RAM via a PCI bus. Normally, the CPU uses a faster bus to write to a DRAM. Therefore, some preferred implementations write to a DRAM buffer area and also write, at a slower rate, to the non-volatile memory. Writing to these two locations but reading out of the non-volatile memory provides the required power hit tolerance for a gaming machine but also allows the emulator to write at a much higher speed than is possible for the non-volatile memory.

In the past, game authentication was only performed once, at power-up, because games were stored in non-volatile memory. The games were only approved to be stored in non-alterable memory. Now, using emulation, the games reside in alterable memory. By law, this means that authentication must be done continuously. However, inside the object code of the legacy game binaries, authentication is still only performed once, at power-up.

Preferred implementations of the invention authenticate the legacy game binary (e.g., by hashing) during execution. Such authentication may be performed by the emulator or by another software module. These techniques extend the types of memory in which the game can be stored without having to re-submit each legacy game for approval.

Some implementations of the invention allow a game binary to be authenticated by a different algorithm than the one specified by the game binary itself. If the game binaries were compiled with an authentication technique that has subsequently been cracked/broken by hackers, a new authentication technique may be introduced into the binaries without having to re-compile them and re-submit them for approval. For example, if the legacy game binary had used the MD5 algorithm for authentication, the emulator could read the corresponding command (of the game binary) to execute the MD5 algorithm, execute some new authentication mechanism that is considered better/higher value, then hand back a response to the game binary indicating "You passed," as if the MD5 algorithm had been run.

Figure 13:
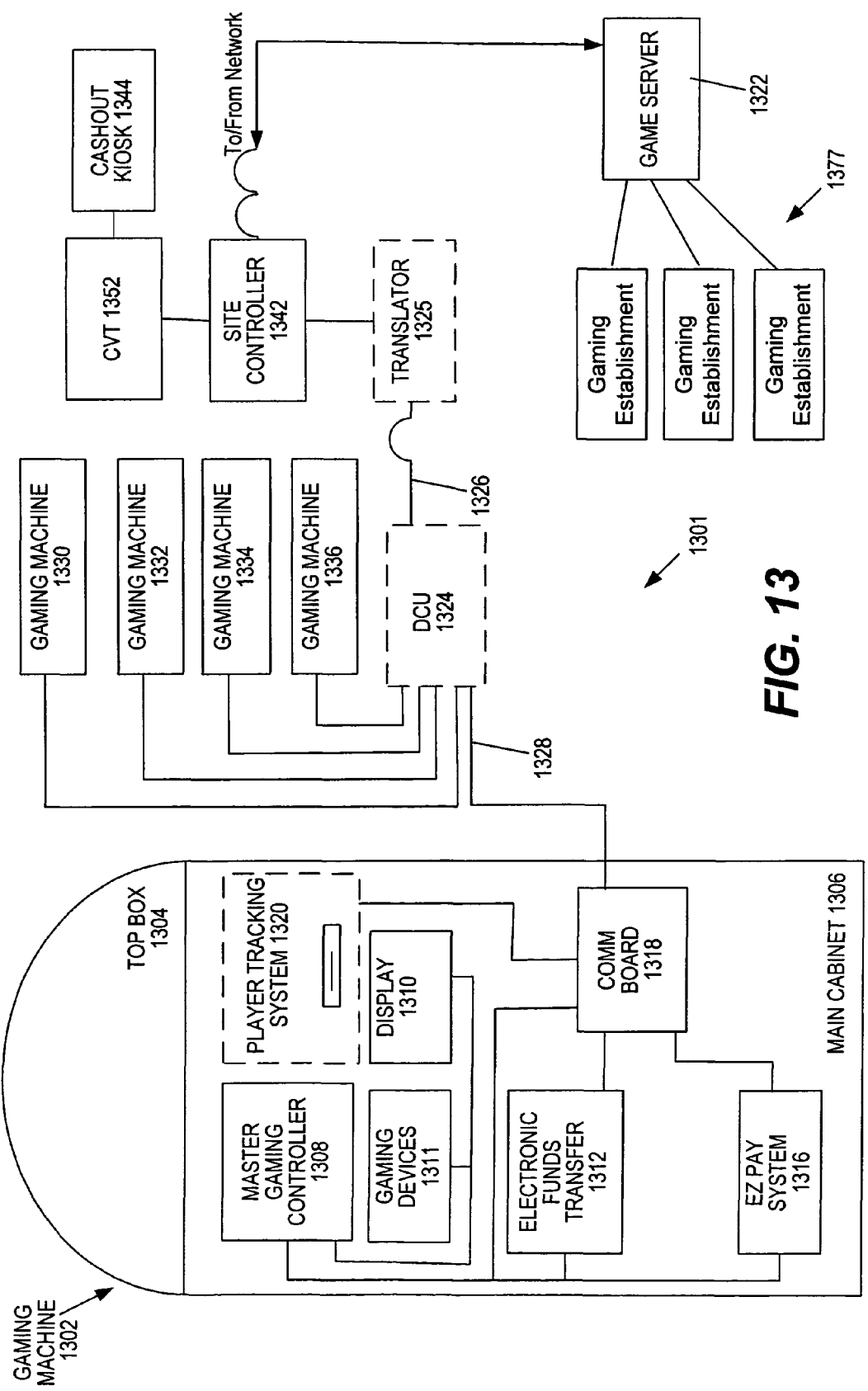
FIG. 13 illustrates a gaming machine and a gaming network that may be configured according to some aspects of the invention.

A gaming network that may be used to implement additional methods performed in accordance with embodiments of the invention is depicted in FIG. 13. Gaming establishment 1301 could be any sort of gaming establishment, such as a casino, a card room, an airport, a store, etc. In this example, gaming network 1377 includes more than one gaming establishment, all of which are networked to game server 1322.

Here, gaming machine 1302, and the other gaming machines 1330, 1332, 1334, and 1336, include a main cabinet 1306 and a top box 1304. The main cabinet 1306 houses the main gaming elements and can also house peripheral systems, such as those that utilize dedicated gaming networks. The top box 1304 may also be used to house these peripheral systems.

The master gaming controller 1308 controls the game play on the gaming machine 1302 according to instructions and/or game data from game server 1322 or stored within gaming machine 1302 and receives or sends data to various input/output devices 1311 on the gaming machine 1302. In one embodiment, master gaming controller 1308 includes processor(s) and other apparatus of the gaming machines described above in FIGS. 6 and 7. The master gaming controller 1308 may also communicate with a display 1310.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1308 may also communicate with EFT system 1312, EZPay™ system 1316 (a proprietary cashless ticketing system of the present assignee), and player tracking system 1320. The systems of the gaming machine 1302 communicate the data onto the network 1322 via a communication board 1318.

It will be appreciated by those of skill in the art that embodiments of the present invention could be implemented on a network with more or fewer elements than are depicted in FIG. 13. For example, player tracking system 1320 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1324 and translator 1325 are not required for all gaming establishments 1301. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1342 provides this function for gaming establishment 1301. Site controller 1342 is connected to a central system and/or other gaming establishments via one or more networks, which may be public or private networks. Among other things, site controller 1342 communicates with game server 1322 to obtain game data, such as ball drop data, bingo card data, etc.

In the present illustration, gaming machines 1302, 1330, 1332, 1334 and 1336 are connected to a dedicated gaming network 1322. In general, the DCU 1324 functions as an intermediary between the different gaming machines on the network 1322 and the site controller 1342. In general, the DCU 1324 receives data transmitted from the gaming machines and sends the data to the site controller 1342 over a transmission path 1326. In some instances, when the hardware interface used by the gaming machine is not compatible with site controller 1342, a translator 1325 may be used to convert serial data from the DCU 1324 to a format accepted by site controller 1342. The translator may provide this conversion service to a plurality of DCUs.

Further, in some dedicated gaming networks, the DCU 1324 can receive data transmitted from site controller 1342 for communication to the gaming machines on the gaming network. The received data may be, for example, communicated synchronously to the gaming machines on the gaming network.

Here, CVT 1352 provides cashless and cashout gaming services to the gaming machines in gaming establishment 1301. Broadly speaking, CVT 1352 authorizes and validates cashless gaming machine instruments (also referred to herein as "tickets" or "vouchers"), including but not limited to tickets for causing a gaming machine to display a game result and cash-out tickets. Moreover, CVT 1352 authorizes the exchange of a cashout ticket for cash. These processes will be described in detail below. In one example, when a player attempts to redeem a cashout ticket for cash at cashout kiosk 1344, cash out kiosk 1344 reads validation data from the cashout ticket and transmits the validation data to CVT 1352 for validation. The tickets may be printed by gaming machines, by cashout kiosk 1344, by a stand-alone printer, by CVT 1352, etc. Some gaming establishments will not have a cashout kiosk 1344. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 14:
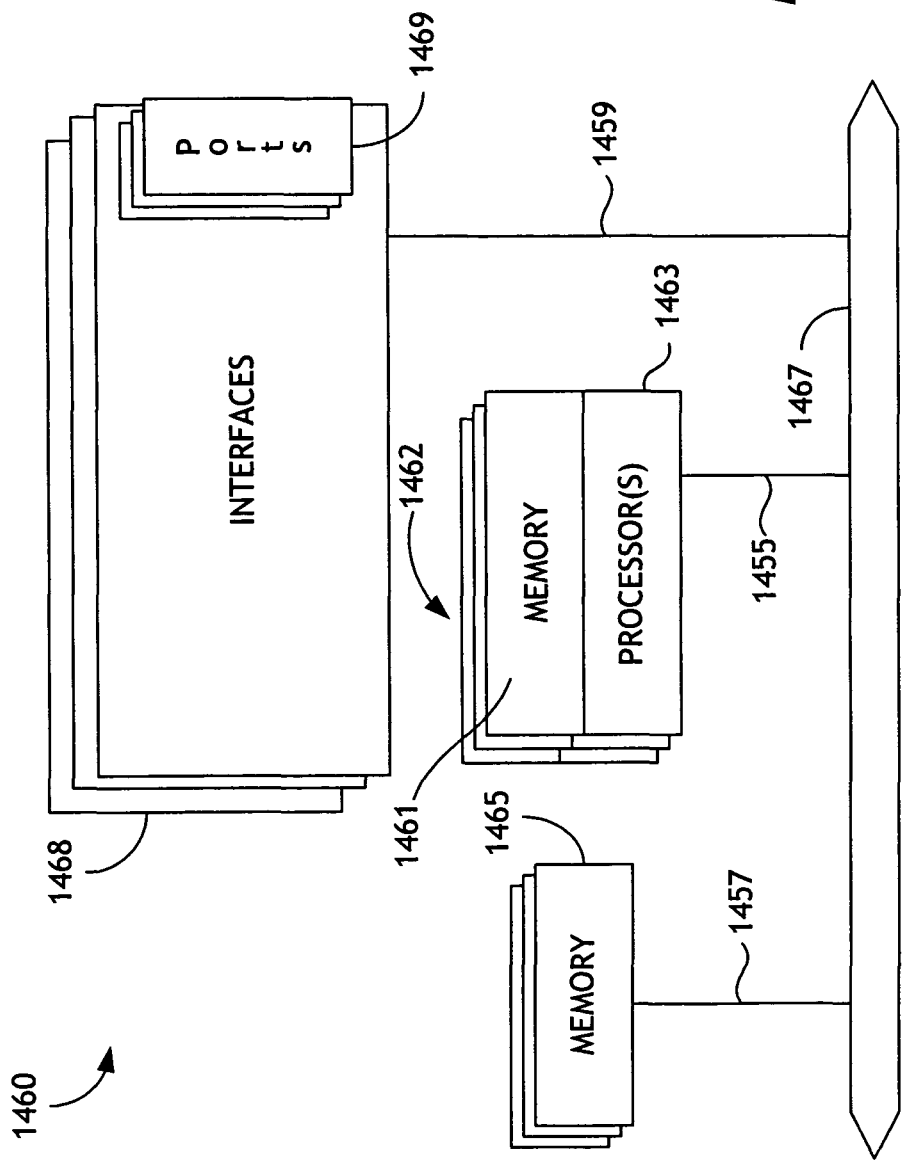
FIG. 14 illustrates a network device that may be configured according to some aspects of the invention.

FIG. 14 illustrates an example of a network device that may be configured for implementing some methods of the present invention. Network device 1460 includes a master central processing unit (CPU) 1462, interfaces 1468, and a bus 1467 (e.g., a PCI bus). Generally, interfaces 1468 include ports 1469 appropriate for communication with the appropriate media. In some embodiments, one or more of interfaces 1468 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1468 control such communications-intensive tasks as encryption, decryption, compression, decompression, packetization, media control and management. By providing separate processors for the communications-intensive tasks, interfaces 1468 allow the master microprocessor 1462 efficiently to perform other functions such as routing computations, network diagnostics, security functions, etc.

The interfaces 1468 are typically provided as interface cards (sometimes referred to as "linecards"). Generally, interfaces 1468 control the sending and receiving of data packets over the network and sometimes support other peripherals used with the network device 1460. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1462 may be responsible for implementing specific functions associated with the functions of a desired network device. According to some embodiments, CPU 1462 accomplishes all these functions under the control of software including an operating system and any appropriate applications software.

CPU 1462 may include one or more processors 1463 such as a processor from the Motorola family of microprocessors or the MIPS family of microprocessors. In an alternative embodiment, processor 1463 is specially designed hardware for controlling the operations of network device 1460. In a specific embodiment, a memory 1461 (such as non-volatile RAM and/or ROM) also forms part of CPU 1462. However, there are many different ways in which memory could be coupled to the system. Memory block 1461 may be used for a variety of purposes such as, for example, caching and/or storing data, programming instructions, etc.

Regardless of network device's configuration, it may employ one or more memories or memory modules (such as, for example, memory block 1465) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 14 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 14) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

We claim:

1. A method of managing a gaming network, comprising:
providing a first game of chance on a gaming machine, the gaming machine having a first gaming machine architecture;
storing game information, including but not limited to at least one game state for the gaming machine while the first game of chance is being provided, on a non-volatile memory;
receiving an indication that a second game of chance will be provided on the gaming machine;
uploading the game information to a memory of a first networked device via the gaming network;
determining whether the second game of chance was written for the first gaming machine architecture;
providing the second game of chance according to whether the second game of chance was written for the first gaming machine architecture;
loading the game information, including the at least one game state, from the non-volatile memory into a memory of a second networked device;
emulating the first game of chance on the second networked device in accordance with the at least one game state to provide an emulated game of chance; and
reproducing at least one game display of the first game of chance in the emulated game of chance on the second networked device.

2. The method of claim 1, wherein it is determined that the second game of chance was written for a second gaming machine architecture, further comprising the step of emulating the second gaming machine architecture on the gaming machine.

3. The method of claim 2, wherein the gaming machine comprises a first processor having a first set of machine code instructions and wherein the step of emulating the second gaming machine architecture comprises emulating a second processor having a second set of machine code instructions.

4. The method of claim 2, wherein the gaming machine comprises a first set of peripheral devices and wherein the step of emulating the second gaming machine architecture comprises emulating a second gaming machine having a second set of peripheral devices.

5. The method of claim 1, wherein the indication is received from a gaming management server.

6. The method of claim 5, further comprising the step of downloading the second game of chance from the gaming management server.

7. The method of claim 1, wherein the indication is received from an input device of the gaming machine.

8. The method of claim 1, wherein the at least one display of the gaming machine was displayed on the gaming machine at the time of a disputed event.

9. The method of claim 8, wherein the second networked device is one of a host device and a personal digital assistant.

10. The method of claim 1, further comprising the step of enabling or disabling emulation software according to the determination of the determining step.

11. The method of claim 1, wherein the at least one game state is accessible to the first game of chance at first memory addresses relevant to the first gaming machine architecture,
the at least one game of chance comprises non-native machine instructions,
the game information, including the at least one game state, is loaded into the memory of the second networked device at second memory addresses relevant to an architecture of the second networked device, and
wherein emulating the first game of chance on the second networked device comprises:
emulating the first gaming machine architecture on the second networked device:
translating the non-native machine instructions to native instructions from the architecture of the second networked device;
executing the native instructions on the second networked device; and
translating memory addresses from the first addresses to the second addresses, and executing at least a portion of the first game of chance on the second networked device.

12. The method of claim 1, wherein the at least one game display comprises an outcome of the first game of chance previously displayed on the gaming machine.

13. A system for managing a gaming network, the system comprising:
a gaming network;
a gaming machine having a first gaming machine architecture;
a non-volatile memory;
a first networked device;
a second networked device; and
logic configured to do the following:
provide a first game of chance on the gaming machine;
store game information, including but not limited to at least one game state for the gaming machine while the first game of chance is being provided, on the non-volatile memory;
receive an indication that a second game of chance will be provided on the gaming machine;
upload the game information to a memory of the first networked device via the gaming network;
determine whether the second game of chance was written for the first gaming machine architecture;
provide the second game of chance according to whether the second game of chance was written for the first gaming machine architecture;
load the game information, including the at least one game state, from the nonvolatile memory into a memory of the second networked device;
emulate the first game of chance on the second networked device in accordance with the at least one game state to provide an emulated game of chance; and
reproduce at least one game display of the first game of chance in the emulated game of chance on the second networked device.

* * * * *